United States Patent
Liu et al.

(10) Patent No.: US 10,268,894 B2
(45) Date of Patent: Apr. 23, 2019

(54) IMAGE FLOW ANALYZING METHOD WITH LOW DATUM STORAGE AND LOW DATUM COMPUTATION AND RELATED CAMERA DEVICE AND CAMERA SYSTEM

(71) Applicant: VIVOTEK INC., New Taipei (TW)

(72) Inventors: Cheng-Chieh Liu, New Taipei (TW); Chih-Yen Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 100 days.

(21) Appl. No.: 15/602,120

(22) Filed: May 23, 2017

(65) Prior Publication Data

US 2017/0344831 A1 Nov. 30, 2017

(30) Foreign Application Priority Data

May 26, 2016 (TW) .............................. 105116415 A

(51) Int. Cl.
*G06K 9/00* (2006.01)
*G06T 7/20* (2017.01)

(52) U.S. Cl.
CPC ..... *G06K 9/00744* (2013.01); *G06K 9/00771* (2013.01); *G06T 7/20* (2013.01); *G06T 2207/10016* (2013.01)

(58) Field of Classification Search
USPC ....... 382/103, 100, 107, 162, 181, 195–197, 382/206, 210, 276, 286
See application file for complete search history.

(56) References Cited

U.S. PATENT DOCUMENTS

2016/0323532 A1* 11/2016 Gouda ..................... G09G 5/00
2017/0289526 A1* 10/2017 Sasatani ................... G06T 7/85

OTHER PUBLICATIONS

"Computer Vision" chapter 9, Mar. 2000, courses.cs.washington.edu, author name not available (Year: 2000).*
"Analysis of Optical Flow Constraints", IEEE Transactions on Image Processing, vol. 4 No. 5, Apr. 1995, Alberto Del Bimbo, Paolo Nesi, and Jorge L. C. Sanz (Year: 1995).*
"Interpretation of image flow: a Spatio-Temporal Approach", IEEE Transactions on Pattern Analysis and Machine Intelligence, Apr. 1989, Muralidhara Subbarao (Year: 1989).*

* cited by examiner

*Primary Examiner* — Dwayne D Bost
*Assistant Examiner* — Stephen M Brinich
(74) *Attorney, Agent, or Firm* — Winston Hsu

(57) ABSTRACT

An image flow analyzing method with low datum storage and low datum computation is applied to a related camera device and a related camera system. The image flow analyzing method includes defining a monitoring region on a video image, detecting an input timing and an output timing of an object passing through the monitoring region, utilizing the input timing and the output timing to compute a first average staying amount and a first average staying period of the object within the monitoring region via a specific time length, and utilizing the first average staying amount and the first average staying period to compute a second average staying amount and a second average staying period of the object within a statistics range defined by several specific time lengths in accordance with an external command.

13 Claims, 5 Drawing Sheets

IMAGE FLOW ANALYZING METHOD WITH LOW DATUM STORAGE AND LOW DATUM COMPUTATION AND RELATED CAMERA DEVICE AND CAMERA SYSTEM

BACKGROUND OF THE INVENTION

1. Field of the Invention

The present invention relates to an image flow analyzing method and related apparatuses, and more particularly, to an image flow analyzing method with low datum storage and low datum computation and a related camera device and a related camera system.

2. Description of the Prior Art

A monitoring camera is used to capture an image of a monitoring region over a long period of time, and a related monitoring video can be checked at a later date for special condition. The conventional flow analyzing technique stores an entering time, a leaving time and a waiting period of all objects in order to analyze a flow of moving objects inside the monitoring region, and then computes flow statistic information of each object during different time cycles in accordance with the actual demand; however, storage capacity of the monitoring camera cannot afford such enormous information quantity. Any of the moving objects passing the monitoring region is recorded as an exclusive datum by the conventional flow analyzing technique, and the monitoring camera installed in the busy region (such line the market or the lobby) is difficult to abide mass datum storage and heavy datum computation. Design of a monitoring method capable of decreasing flow computation and hardware requirement is an important issue in the monitor industry.

SUMMARY OF THE INVENTION

The present invention provides an image flow analyzing method with low datum storage and low datum computation and a related camera device and a related camera system for solving above drawbacks.

According to the claimed invention, an image flow analyzing method with low datum storage and low datum computation is disclosed. The image flow analyzing method includes steps of defining a monitoring region on a video image, detecting an input timing and an output timing of at least one object passing through the monitoring region, utilizing the input timing and the output timing to compute a first average staying amount of the at least one object within the monitoring region via a specific time length, utilizing the input timing and the output timing to compute a first average staying period of the at least one object within the monitoring region via the specific time length, and utilizing the first average staying amount and the first average staying period to compute a second average staying amount and a second average staying period of the at least one object within a statistics range defined by N number of specific time lengths in accordance with an external command. The number of N is a positive integer.

According to the claimed invention, a camera device with an image flow analyzing function includes an image capturing unit and a computing controlling unit. The image capturing unit is adapted to capture a video image. The computing controlling unit is electrically connected to the image capturing unit. The computing controlling unit is adapted to define a monitoring region on a video image, detect an input timing and an output timing of at least one object passing through the monitoring region, utilize the input timing and the output timing to compute a first average staying amount of the at least one object within the monitoring region via a specific time length, utilize the input timing and the output timing to compute a first average staying period of the at least one object within the monitoring region via the specific time length and utilize the first average staying amount and the first average staying period to compute a second average staying amount and a second average staying period of the at least one object within a statistics range defined by N number of specific time lengths in accordance with an external command, so as to compute an average staying amount and an average staying period of the at least one object inside the video image via the specific time length, wherein the number of N is a positive integer.

According to the claimed invention, a camera system with an image flow analyzing function includes a camera device and an analyzing device. The camera device has an image capturing unit to capture a video image. The analyzing device has a computing controlling unit electrically connected to the image capturing unit. The computing controlling unit is adapted to define a monitoring region on a video image, detect an input timing and an output timing of at least one object passing through the monitoring region, utilize the input timing and the output timing to compute a first average staying amount of the at least one object within the monitoring region via a specific time length, utilize the input timing and the output timing to compute a first average staying period of the at least one object within the monitoring region via the specific time length and utilize the first average staying amount and the first average staying period to compute a second average staying amount and a second average staying period of the at least one object within a statistics range defined by N number of specific time lengths in accordance with an external command, so as to compute an average staying amount and an average staying period of the at least one object inside the video image via the specific time length, wherein the number of N is a positive integer.

The image flow analyzing method of the present invention does not establish storage data (such like related period information) for each object passing through the monitoring region, the image flow analyzing method computes average parameters (such as the average staying amount and the average staying period) of all the objects within the monitoring region via the specific time length, so that datum quantity is effectively decreased and storage capacity of the camera device and/or the camera system can be economized accordingly. The storage datum uses the specific time length as the basic unit, and the image flow analyzing method can arbitrarily combine plenty of the specific time lengths to quantify statistic information of the monitoring region during different time periods. For instance, the foresaid embodiment produces the specific time length using one minute as the basic unit, and the image flow analyzing method can freely combine the statistic information with a timing range about N minutes (the number of N is the positive integer); while the specific time length uses twenty seconds as the basic unit, the image flow analyzing method can combine the statistic information with the timing range about forty seconds, sixty seconds and eighty seconds optionally. The present invention can effectively decrease datum storage of the image flow analyzing function to economize hardware cost of the camera device and the camera system, and further can increase operation efficacy of the image flow analyzing function to provide preferred customer experience.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
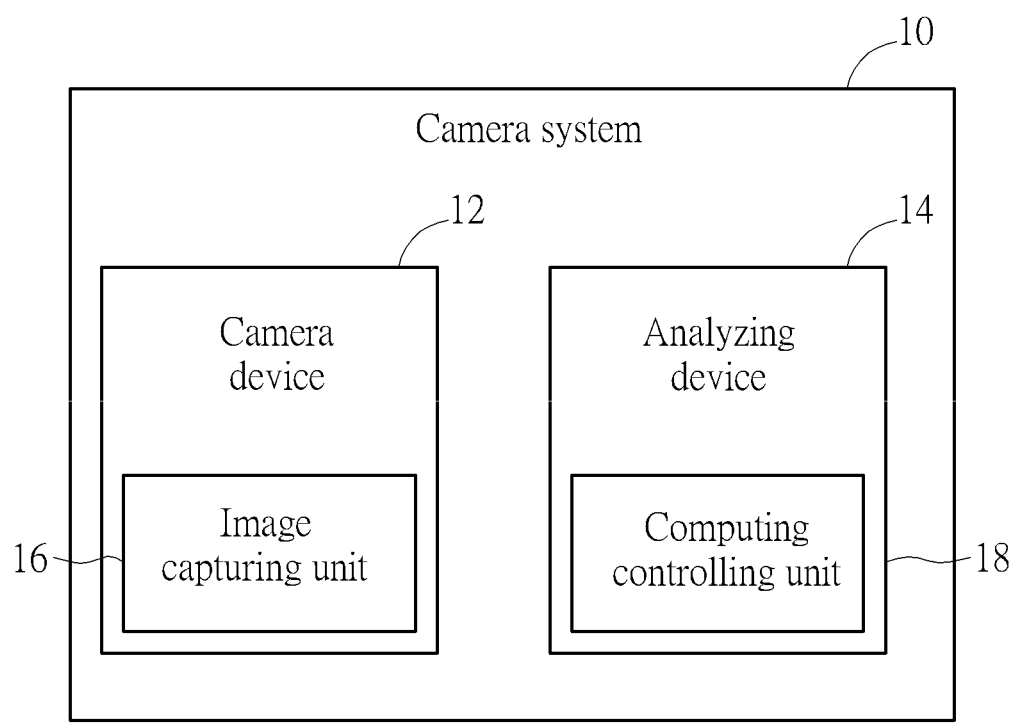
FIG. 1 is a functional block diagram of a camera system according to an embodiment of the present invention. The camera system 10
Figure 2:
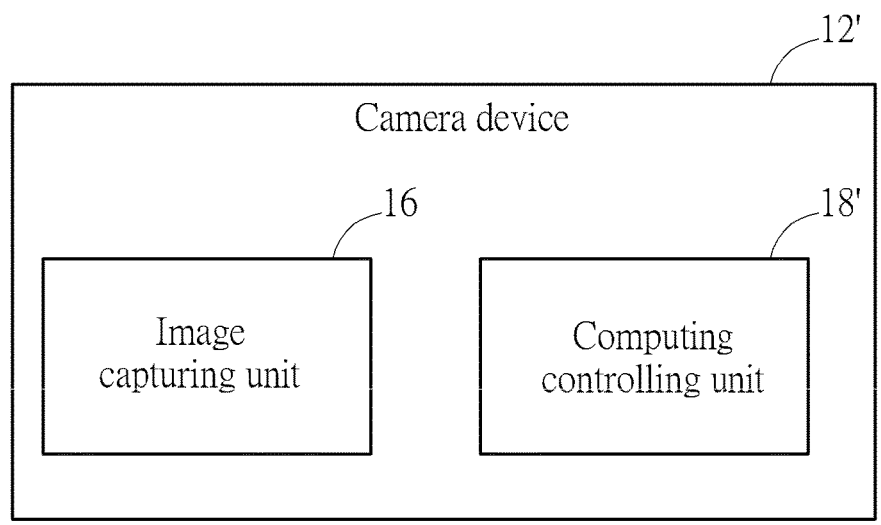
FIG. 2 is a functional block diagram of the camera device according to another embodiment of the present invention.

Please refer to FIG. 1. FIG. 1 is a functional block diagram of a camera system 10 according to an embodiment of the present invention. The camera system 10 includes a camera device 12 and an analyzing device 14. The camera device 12 has an image capturing unit 16 aligning with a specific space, and the image capturing unit 16 can capture a video image with regard to the said space. The analyzing device 14 has a computing controlling unit 18 electrically connected to the image capturing unit 16. The computing controlling unit 18 can execute an image flow analyzing method utilized to compute an average staying amount and an average staying period of at least one or more objects within the video image via a specific time length, and the average staying amount and the average staying period are used to show statistics information of the object inside the said space during each time period. Please refer to FIG. 2. FIG. 2 is a functional block diagram of the camera device 12' according to another embodiment of the present invention. In other possible embodiment, the camera device 12' may have the built-in computing controlling unit 18', which is electrically connected to the image capturing unit 16 to execute the image flow analyzing method, and content of the image flow analyzing method is illustrated as following description.

Figure 3:
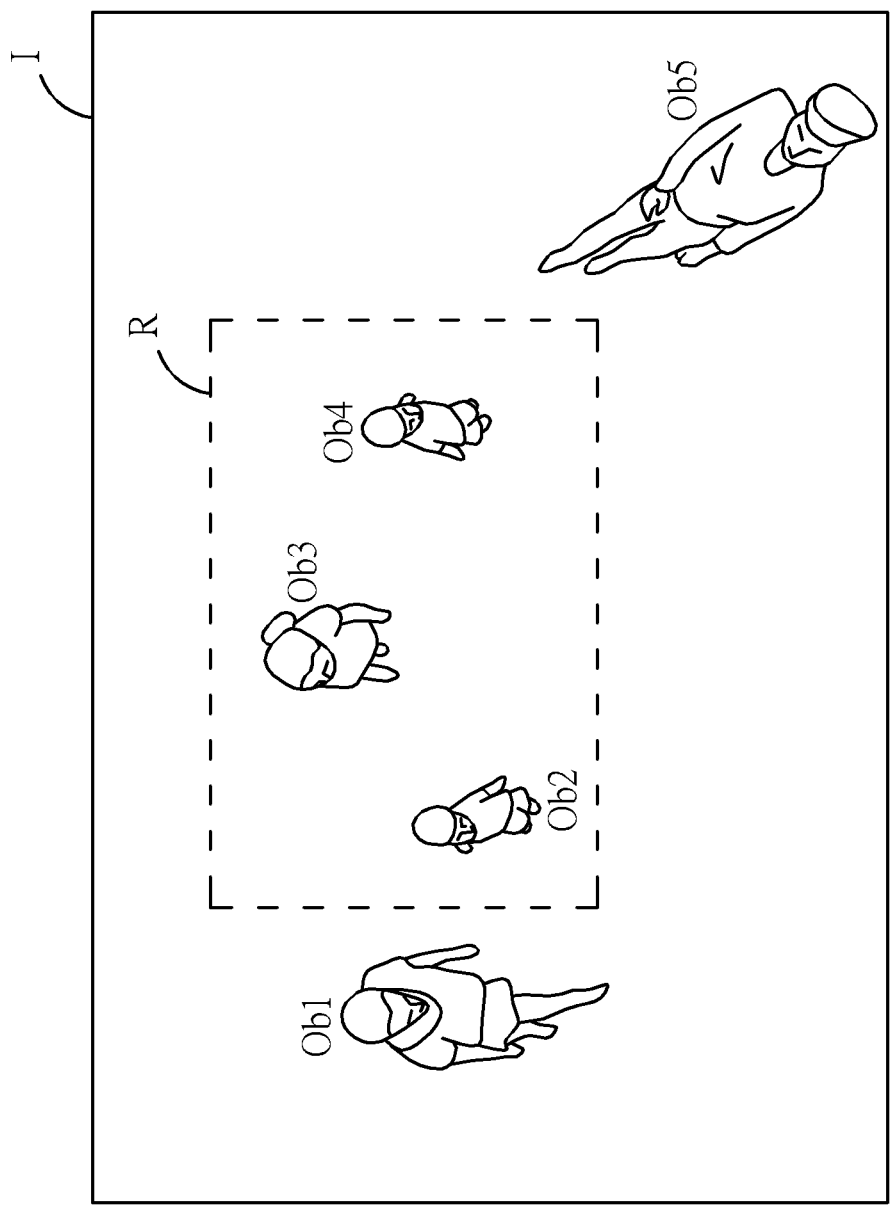
FIG. 3 is a diagram of the video image according to the embodiment of the present invention.
Figure 4:
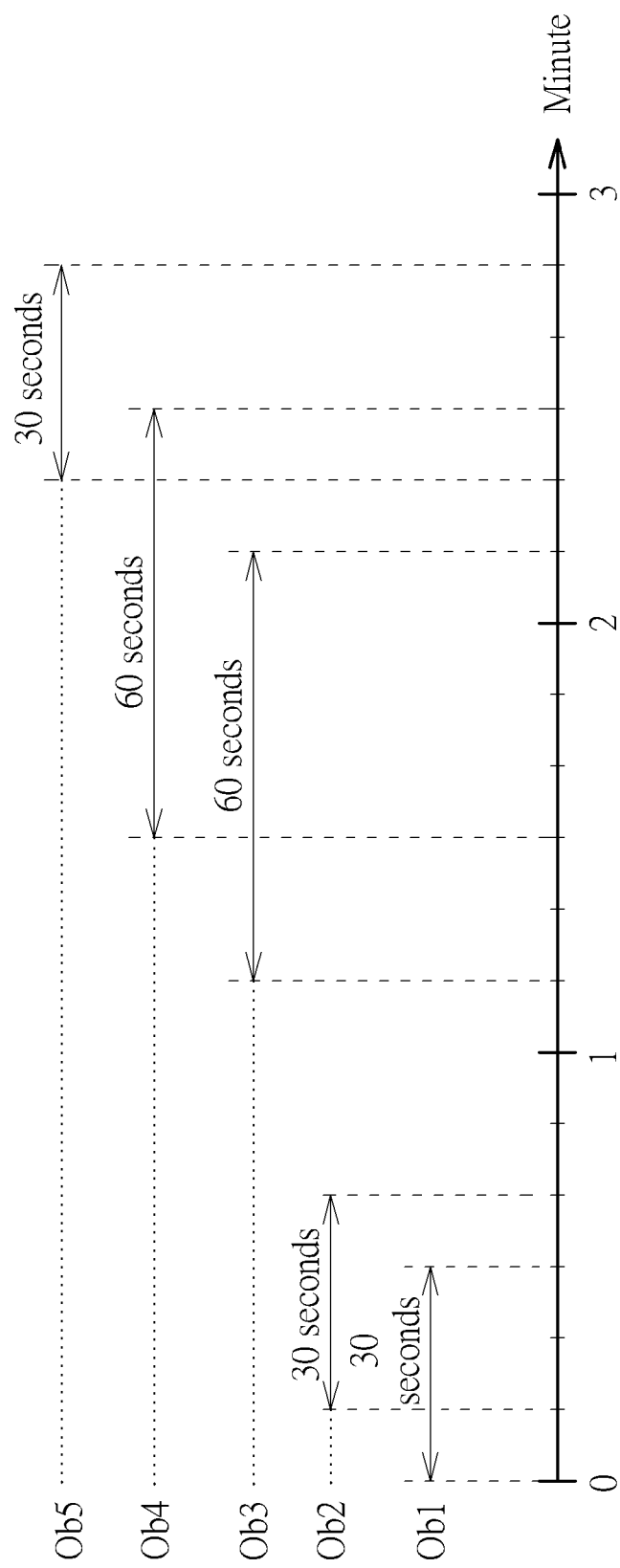
FIG. 4 is a diagram of staying periods about the object within the video image according to the embodiment of the present invention.
Figure 5:
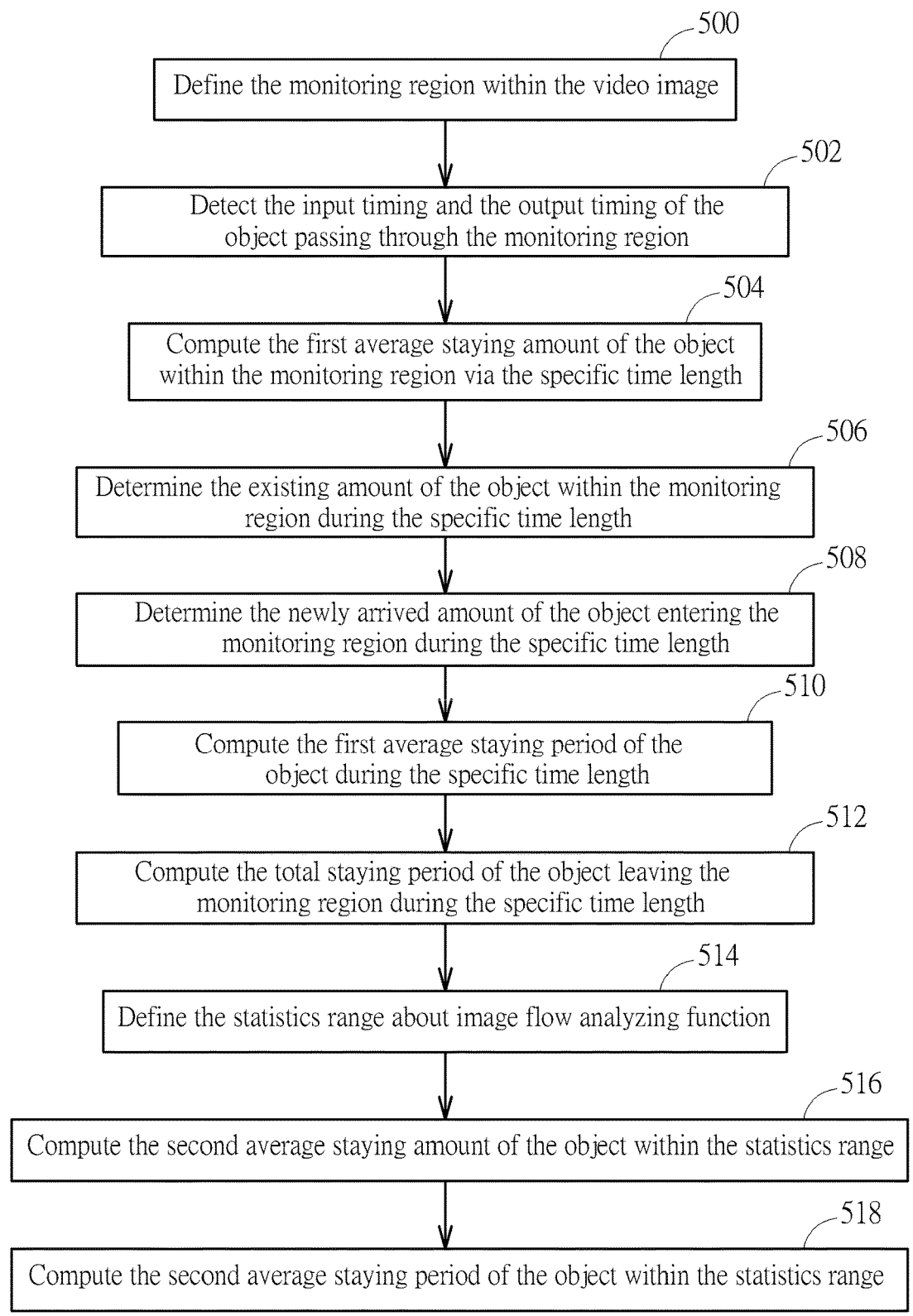
FIG. 5 is a flow chart of the image flow analyzing method according to the embodiment of the present invention.

Please refer to FIG. 1 to FIG. 5. FIG. 3 is a diagram of the video image I according to the embodiment of the present invention. FIG. 4 is a diagram of staying periods about the object within the video image I according to the embodiment of the present invention. FIG. 5 is a flow chart of the image flow analyzing method according to the embodiment of the present invention. The image capturing unit 16 faces the specific space to capture the video image I, an entrance inside the specific space can be set as a target of the image flow analyzing method, and the image flow analyzing method defines a monitoring region R related to the preset entrance within the video image I for a start. The monitoring region R is an independent region. The monitoring region R further can be a plurality of regions fully overlapped, partly overlapped or separated from each other. Variation of the monitoring region R depends on actual demand. In some situation, the image capturing unit 16 is an image sensor inside the camera for capturing the video image I about the specific space. The image flow analyzing method uses the specific time length as a unit for setting the capturing period.

For example, in the capturing process of the image capturing unit 16, one minute can be taken as the unit to define a plurality of specific time lengths, so that an interval between an initial point (ex. 0 second) and the first minute (ex. the $60^{th}$ second) is set as the first specific time length, an interval between the first minute (ex. the $61^{th}$ second) and the second minute (ex. the $120^{th}$ second) is set as the second specific time length, and an interval between the second minute (ex. the $121^{th}$ second) and the third minute (ex. the $180^{th}$ second) is set as the third specific time length.

The image flow analyzing method can acquire information of all objects Ob1, Ob2, Ob3, Ob4 and Ob5 inside the monitoring region R. An existing amount is computed and represented as a sum of the object appearing on the monitoring region R during the specific time length, and a newly arrived amount is computed and represented as a sum of the object entering the monitoring region R during the specific time length. As shown in the following Table 1 and FIG. 4, the existing amount of the object within the monitoring region R during the first specific time length equals two (which represents the object Ob1 and the object Ob2), and the newly arrived amount during the first specific time length equals two (which means the object Ob1 and the object Ob2); the existing amount during the second specific time length equals two (which means the object Ob3 and the object Ob4), and the newly arrived amount during the second specific time length equals two (which means the object Ob3 and the object Ob4); the existing amount during the third specific time length equals three (which means the object Ob3, object Ob4 and the object Ob5), and the newly arrived amount during the third specific time length equals one (which means the object Ob5).

Then, the image flow analyzing method computes the first average staying amount and the first average staying period of the object Ob1, Ob2, Ob3, Ob4 and Ob5 within the monitoring region R. The first average staying amount is computed and represented as a ratio sum of staying periods of all the objects within the monitoring region R to the specific time length, and the first average staying period is computed and represented as a ratio of the total staying period to the existing amount about all the objects within the monitoring region R. As shown in the following Table 1 and FIG. 4, the first average staying amount of the object within the monitoring region R during the first specific time length equals one, such like an equation of 30/60+30/60=1 (which means the objects Ob1 stays for thirty seconds during the first specific time length, and the object Ob2 stays for thirty seconds during the first specific time length), the first average staying period during the first specific time length equals thirty seconds, such like an equation of (30+30)/2=30; the first average staying amount during the second specific time length equals 1.33, such like an equation of 50/60+30/60=1.33, and the first average staying period during the second specific time length equals forty seconds, such like an equation of (50+30)/2=40; the first average staying amount during the third specific time length equals 1.16, suchlike an equation of 10/60+30/60+30/60=1.16, and the first average staying period during the third specific time length equals fifty seconds, such like an equation of (60+60+30)/3=50.

The image flow analyzing method computes the total staying period of the objects leaving the monitoring region R during each specific time length. The total staying period is computed and represented as a sum of staying periods of all the objects departed from the monitoring region R during the related specific time length. As shown in the following Table 1 and FIG. 4, the object Ob1 and the object Ob2 leave the monitoring region R during the first specific time length, and the total staying period equals sixty seconds; there are no object leaving the monitoring region R during the second specific time length, and the total staying period during the second specific time length equals zero and will be counted when the objects Ob3 and Ob4 are departed from the monitoring region R. The object Ob3, the object 4 and the object Ob5 leave the monitoring region R during the third specific time length, and the total staying period equals one hundred and fifty seconds (such like an equation of 60+60+ 30=150). Final, the second average staying amount of all the objects within the monitoring region R from the initial point to the third minute is computed, the image flow analyzing method utilizes the following formula 1-1 to compute a mean of the three first average staying amounts to acquire that the second average staying amount equals 1.16, such like an equation of (1+1.33+1.16)/3=1.16; for computing the second average staying period of all the objects within the monitoring region R from the initial point to the third minute, the image flow analyzing method utilizes the following formula 2-1 to acquire that the second average staying period equals forty-two seconds, such like an equation of (50×3+0+60)/(1+2+2)=42.

TABLE 1

|  | The first specific time length | The second specific time length | The third specific time length |
|---|---|---|---|
| Existing amount | 2 | 2 | 3 |
| Newly arrived amount | 2 | 2 | 1 |
| First average staying amount | 1 | 1.33 | 1.16 |
| First average staying period | 30 | 40 | 50 |
| Total staying period | 60 | 0 | 150 | second average staying amount=[($3^{rd}$ first average staying amount)+($2^{nd}$ first average staying amount)+($1^{st}$ first average staying amount)]/3   Formula 1-1:

Formula 2-1: second average staying period=[($3^{rd}$ first average staying period)*($3^{rd}$ existing amount)+($2^{nd}$ total staying period)+($1^{st}$ total staying period)]/[($3^{rd}$ newly arrived amount)+ ($2^{nd}$ newly arrived amount)+($1^{st}$ existing amount)]   Formula 2-1:

As shown in FIG. 4 and FIG. 5, the image flow analyzing method executes step 500 to define location and dimensions of the monitoring region R within the video image I in an automatic manner or in a manually operating manner. Then, step 502 is executed to detect a moving track of the object passing through the monitoring region R for acquiring an input timing and an output timing of the object striding across a boundary of the monitoring region R. According to the input timing and the output timing, a staying period of each object (such as the objects Ob1-Ob5) within the monitoring region R can be computed; for example, the staying periods of the object Ob1, the object Ob2 and the object Ob5 equals thirty seconds, the staying periods of the object Ob3 and the object Ob4 equals sixty seconds, and the objects Ob1-Ob5 may move across different time intervals. Though the embodiment owns five objects, an amount of the object can be adjusted and depends on actual demand.

The image flow analyzing method executes step 504 of utilizing the input timing and the output timing to compute the first average staying amount of all the objects Ob1-Ob5 within the monitoring region R during each specific time length. The first average staying amount is represented as a ratio of the total staying period of the objects Ob1-Ob5 within the monitoring region R to the specific time length; for example, the object Ob1 and the object Ob2 respectively stay inside the monitoring region R for a half of the specific time length, and the first average staying amount about the objects Ob1 and Ob2 can be indicated as there is an object stayed inside the monitoring region R all the time. In addition, the image flow analyzing method executes steps 506 and 508 to determine the existing amount of the objects Ob1-Ob5 within the monitoring region R during each specific time length, and determine the newly arrived amount of the objects Ob1-Ob5 entering the monitoring region R during each specific time length.

As shown in the foresaid Table 1 and FIG. 4, the existing amount is represented as a sum of the objects Ob1-Ob5 appearing on the monitoring region R during each specific time length, and the newly arrived amount is represented as a sum of the objects Ob1-Ob5 entering the monitoring region R after the initial point of each specific time length. For example, the object Ob5 is new addition to the monitoring region R which already owns the Ob3 and the object Ob4 during the third specific time length, so that the existing amount equals three and the newly arrived amount equals one about the third specific time length. As the staying period of one or more objects from the objects Ob1-Ob5 within the monitoring region R move across two adjacent specific time lengths, the said one or more objects is defined as the newly arrived object about the former specific time length; therefore, while the staying period of a certain object within the monitoring region R is ranged over the (N−1)th specific time length and the Nth specific time length, the newly arrived amount of the certain object belongs to the (N−1)th specific time length.

The image flow analyzing method executes steps 510 and 512 to compute the first average staying period of the objects Ob1-Ob5 during each specific time length, and compute the total staying period of the objects Ob1-Ob5 leaving the monitoring region R during each specific time length. The first average staying period is represented as a ratio of the total staying period to the existing amount about the objects Ob1-Ob5 within the monitoring region R during each specific time length; for example, the object Ob3 and the object Ob4 stay inside the monitoring region R during the second specific time length respectively for fifty seconds and thirty seconds, so that the first average staying period of the objects Ob3 and Ob4 can be computed as forty seconds. The total staying period is represented as a staying period sum of the objects Ob1-Ob5 leaving the monitoring region R during each specific time length within the statistics range (or N number of the specific time lengths); for example, the total staying period of the object Ob1 and the object Ob2 leaving the monitoring region R during the second specific time length equals sixty seconds, so that the total staying period of the object Ob3 and the object Ob4 during the second specific time length equals zero because the objects Ob3 and Ob4 do not leave the monitoring region R.

The image flow analyzing method executes step 514 to define the statistics range of an image flow analyzing function in accordance with an external command. The statistics range can be defined as a sum of N number of the specific time lengths. As an example in the foresaid embodiment, the sum of three specific time lengths (such like 0~3 min.) is defined as the statistics range, and the number of N can be any positive integer. Final, the image flow analyzing method executes steps 516 and 518 of utilizing the first average staying amount and an amount of the specific time length to compute the second average staying amount of the objects Ob1-Ob5 within the statistics range, and utilizing the existing amount, the newly arrived amount, the first average staying period and the total staying period to compute the second average staying period of the objects Ob1-Ob5 within the statistics range. That is, the second average staying amount is represented as a ratio of the sum of the first average staying amount about each specific time length within the statistics range to the number of N, which can refer to the above-mentioned formula 1-1 or the following formula 1-2.

$$\text{second average staying amount} = [(N^{th} \text{ first average staying amount}) + ((N-1)^{th} \text{ first average staying amount}) + \ldots + (1^{st} \text{ first average staying amount})]/N \quad \text{Formula 1-2:}$$

The second average staying period is a ratio of a first variable quantity to a second variable quantity, and the said ratio further can be interpreted as the average staying period of each object during N number of the specific time lengths. The first variable quantity equals a product of the existing amount and the first average staying period about the Nth specific time length plus the total staying period from the (N-1)th specific time length to the first specific time length. The second variable quantity equals the existing amount of the first specific time length plus the newly arrived amount from the second specific time length to the Nth specific time length, as described in the above-mentioned formula 2-1 or the following formula 2-2. The Nth specific time length illustrated in step 514 can be compared with the third specific time length in Formula 1-1 and Formula 2-1, the number of N is varied in accordance with the actual amount of the specific time length while the image flow analyzing method is applied to other embodiment having the statistics range defined by different time length.

$$\text{second average staying period} = [(N^{th} \text{ first average staying period}) * (N^{th} \text{ existing amount}) + (N-1)^{th} \text{ (total staying period)} + \ldots + (1^{st} \text{ total staying period})]/[(N^{th} \text{ newly arrived amount}) + (N-1)^{th} \text{ (newly arrived amount)} + \ldots + (1^{st} \text{ existing amount})] \quad \text{Formula 2-2:}$$

In conclusion, the image flow analyzing method of the present invention does not establish storage data (such like related period information) for each object passing through the monitoring region, the image flow analyzing method computes average parameters (such as the average staying amount and the average staying period) of all the objects within the monitoring region via the specific time length, so that datum quantity is effectively decreased and storage capacity of the camera device and/or the camera system can be economized accordingly. The storage datum uses the specific time length as the basic unit, and the image flow analyzing method can arbitrarily combine plenty of the specific time lengths to quantify statistic information of the monitoring region during different time periods. For instance, the foresaid embodiment produces the specific time length using one minute as the basic unit, and the image flow analyzing method can freely combine the statistic information with a timing range about N minutes (the number of N is the positive integer); while the specific time length uses twenty seconds as the basic unit, the image flow analyzing method can combine the statistic information with the timing range about forty seconds, sixty seconds and eighty seconds optionally. Comparing to the prior art, the present invention can effectively decrease datum storage of the image flow analyzing function to economize hardware cost of the camera device and the camera system, and further can increase operation efficacy of the image flow analyzing function to provide preferred customer experience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image flow analyzing method with low datum storage and low datum computation, the image flow analyzing method being applied to a computational controller, the image flow analyzing method comprising:
   the computational controller defining a monitoring region on a video image captured by an image receiver electrically connected to the computational controller;
   the computational controller automatically detecting an input timing and an output timing when at least one object passes through the monitoring region;
   the computational controller automatically acquiring a first average staying amount of the at least one object within the monitoring region by the input timing and the output timing in a specific time length;
   the computational controller automatically acquiring a first average staying period of the at least one object within the monitoring region by the input timing and the output timing in the specific time length; and
   the computational controller setting a statistics range defined by N number of specific time lengths and automatically acquiring a second average staying amount and a second average staying period of the at least one object within the statistics range by readjustment of the first average staying amount and the first average staying period in accordance with an external command, wherein the number of N is a positive integer.

2. The image flow analyzing method of claim 1, wherein the first average staying amount computed via the specific time length is represented as: a ratio of a total staying period of the at least one object within the monitoring region to the specific time length.

3. The image flow analyzing method of claim 1, wherein the second average staying amount within the statistics range is represented as: a ratio of a sum of the first average staying amount during each specific time length within the statistics range to the number of N.

4. The image flow analyzing method of claim 1, further comprising:
   the computational controller determining an existing amount of the at least one object within the monitoring region during each specific time length;
   the computational controller determining a newly arrived amount of the at least one object entering the monitoring region during each specific time length;
   the computational controller acquiring the first average staying period of the at least one object during each specific time length;
   the computational controller acquiring a total staying period of the at least one object leaving the monitoring region during each specific time length; and
   the computational controller acquiring the second average staying period of the at least one object within the statistics range in accordance with the existing amount, the newly arrived amount, the first average staying period and the total staying period.

5. The image flow analyzing method of claim 4, wherein the existing amount is represented as: a sum of the at least one object appearing on the monitoring region during each specific time length.

6. The image flow analyzing method of claim 4, wherein the newly arrived amount is represented as: a sum of the at least one object entering the monitoring region after an initial point of each specific time length.

7. The image flow analyzing method of claim 6, wherein while a staying period of the at least one object is ranged over a Nth specific time length and a (N−1)th specific time length, the newly arrived amount belongs to a corresponding parameter of the (N−1)th specific time length.

8. The image flow analyzing method of claim 4, wherein the first average staying period of each specific time length is represented as: a ratio of the total staying period to the existing amount about the at least one object within the monitoring region.

9. The image flow analyzing method of claim 4, wherein the total staying period is represented as: a staying period sum of the at least one object leaving the monitoring region during each specific time length within the statistics range.

10. The image flow analyzing method of claim 4, wherein a product of the existing amount and the first average staying period about a Nth specific time length plus the total staying period from a (N−1)th specific time length to a first specific time length equals a first variable quantity, the existing amount of the first specific time length plus the newly arrived amount from a second specific time length to the Nth specific time length equals a second variable quantity, the second average staying period within the statistics range is represented as a ratio of the first variable quantity to the second variable quantity.

11. The image flow analyzing method of claim 10, wherein the ratio of the first variable quantity to the second variable quantity is an average staying period of each object from the least one object during the N number of specific time lengths.

12. A camera device with an image flow analyzing function, comprising:
an image receiver adapted to capture a video image; and
a computational controller electrically connected to the image receiver, the computational controller being adapted to define a monitoring region on a video image, automatically detect an input timing and an output timing when at least one object passes through the monitoring region, automatically acquire a first average staying amount of the at least one object within the monitoring region by the input timing and the output timing in a specific time length, automatically acquire a first average staying period of the at least one object within the monitoring region by the input timing and the output timing in the specific time length, set a statistics range defined by N number of specific time lengths to automatically acquire a second average staying amount and a second average staying period of the at least one object within the statistics range by readjustment of the first average staying amount and the first average staying period in accordance with an external command, so as to compute an average staying amount and an average staying period of the at least one object inside the video image via the specific time length, wherein the number of N is a positive integer.

13. A camera system with an image flow analyzing function, comprising:
a camera device, having an image receiver to capture a video image; and
an analyzing device, having a computational controller electrically connected to the image receiver, the computational controller being adapted to define a monitoring region on a video image, automatically detect an input timing and an output timing when at least one object passes through the monitoring region, automatically acquire a first average staying amount of the at least one object within the monitoring region by the input timing and the output timing in a specific time length, automatically acquire a first average staying period of the at least one object within the monitoring region by the input timing and the output timing in the specific time length, and set a statistics range defined by N number of specific time lengths to automatically acquire a second average staying amount and a second average staying period of the at least one object within the statistics range by readjustment of the first average staying amount and the first average staying period in accordance with an external command, so as to compute an average staying amount and an average staying period of the at least one object inside the video image via the specific time length, wherein the number of N is a positive integer.

* * * * *